(12) United States Patent
Mizubata et al.

(10) Patent No.: US 6,321,064 B1
(45) Date of Patent: Nov. 20, 2001

(54) DOCUMENT FEEDING APPARATUS

(75) Inventors: Tsuyoshi Mizubata; Toshio Shida; Masanobu Kawano, all of Tokyo; Yasuhito Watanabe; Makoto Iino, both of Yamanashi, all of (JP)

(73) Assignees: Konica Corporation, Tokyo; Nisca Corporation, Yamanashi, both of (JP)

( * ) Notice: Subject to any disclaimer, the term of this patent is extended or adjusted under 35 U.S.C. 154(b) by 0 days.

(21) Appl. No.: 09/452,497

(22) Filed: Dec. 1, 1999

(30) Foreign Application Priority Data

Dec. 2, 1998 (JP) ................................... 10-342434

(51) Int. Cl.[7] ................................................ G03G 15/00
(52) U.S. Cl. ............................................ 399/370; 399/367
(58) Field of Search ................................. 399/365, 367, 399/369, 370, 373, 374; 271/279, 291, 298, 301

(56) References Cited

U.S. PATENT DOCUMENTS

| | | | |
|---|---|---|---|
| 5,296,908 | * 3/1994 | Hatano et al. | 399/367 X |
| 5,430,536 | 7/1995 | Fullerton et al. | |
| 5,515,153 | * 5/1996 | Tokunoh | 399/374 |
| 5,791,645 | * 8/1998 | Takada | 399/373 X |
| 5,839,044 | * 11/1998 | Taruki | 399/367 |
| 6,081,688 | * 6/2000 | Okada et al. | 399/374 |

FOREIGN PATENT DOCUMENTS

| | | |
|---|---|---|
| 58-59466 | 4/1983 | (JP) . |
| 7-175279 | 7/1995 | (JP) . |

* cited by examiner

*Primary Examiner*—Sandra Brase
(74) *Attorney, Agent, or Firm*—Frishauf, Holtz, Goodman, Langer & Chick, P.C.

(57) ABSTRACT

A document feeding apparatus includes a paper feeding tray, on which a document is placed, a transfer unit that transfers the document placed on the paper feeding tray to a platen glass, a paper delivery tray for receiving the document transferred to the platen glass, and a platen cover for the platen glass. A first paper delivery port is provided for delivering to a short size tray a document whose length in the transfer direction of the document is shorter than a predetermined value, and a second paper delivery port is provided for delivering to said paper delivery tray a document whose length in the transfer direction of the document is longer than the predetermined value. In addition, an image input portion, the second paper delivery port, and the first paper delivery port are arranged in order with a space therebetween in the transfer direction of the document.

11 Claims, 9 Drawing Sheets

DOCUMENT FEEDING APPARATUS

BACKGROUND OF THE INVENTION

1. Field of the Invention

The present invention relates to a document feeding apparatus and more particularly relates to a document feeding apparatus for supplying a document from a paper feeding tray on a platen glass of an image processing apparatus such as an electrophotographic reproducing machine and an image scanner, reading an image of the document on the platen glass, and then delivering the document to a paper delivery tray.

2. Description of the Prior Art

It is publicly known to use a document feeding apparatus so-called as an automatic document feeder (ADF) in order to supply automatically a document to a document reading portion in an image forming apparatus such as an electrophograhic reproducing machine.

The necessity of a document feeding apparatus capable of processing dual-surface documents has been recently increased.

Such a dual-surface document feeding apparatus is described in the Japanese Patent Laid-Open No. 175279/95, for example. The document feeding apparatus has first and second modes. In the first mode, a one-sided document is delivered directly to a paper delivery tray after one side surface of the document is read. In the second mode, a dual-surface document is once fed through a document feeding path to the paper delivery tray after a first surface of the document is read, returned from the paper delivery tray, and then fed again to the document feeding path through a duplex feeding path. Then, the dual-surface document is fed again to the paper delivery tray after a second surface of the document is read, returned from the paper delivery tray, fed again to the document feeding path through the duplex feeding path, and delivered to the paper delivery tray so that the dual-surface documents are stacked one by one on the tray in regular sequence in page order, with the first surface of the documents on the underside. Specifically, the dual-surface document is circulated by a roller for delivering the document to the entrance of the paper delivery tray and for reversing the inside and outside of the document, and by the duplex feeding path for feeding the document from the paper delivery tray to the document feeding path. Further, the dual-surface document is reversed by said roller, and delivered to the paper delivery tray by said roller through a path which has been used for the document whose second surface is read.

However, in the conventional document feeding apparatus as mentioned above, the document must be passed three times through the document reading portion, if the document is a dual-surface document and the documents are stacked one by one on the paper delivery tray in regular sequence in page order. In this case, in the last time of the passing of the document, the document must be passed through the reading portion in spite of the fact that it is not necessary to read the document at the reading portion. As a result the document reading portion becomes dirty, errors occur in image reading, and cleaning of the document reading portion is required frequently.

Further, the document must be passed through the document reading portion after the reading of the document has been completed, and no succeeding document can be fed, so that the processing time of the dual-surface document cannot be shortened.

Furthermore, in such a conventional document feeding apparatus, the paper delivery tray is arranged directly below the paper feeding tray, and the documents are delivered to the same paper delivery tray irrespective the document size, so that a document of short length delivered on the paper delivery tray may be difficult to find because the document is hidden by the paper feeding tray. In addition, the document may be hard to take out because the document is covered by the paper feeding tray.

Japanese Patent Laid-Open No. 59466/83 discloses a document feeding apparatus having two paper delivery trays arranged up and down, wherein an interruption copied document is delivered to an extra paper delivery tray. However, this document feeding apparatus has such a problem that the recognition and taking out of the document delivered to the paper delivery tray of the lower stage are disturbed by the paper delivery tray of the upper stage.

SUMMARY OF THE INVENTION

It is an object of the present invention to provide a document feeding apparatus in which the document reading portion is prevented from being soiled, the feeding and handling time of the dual-surface document can be shortened, and the document delivered in the paper delivery tray can be recognized easily and taken out easily, while solving the above mentioned defects of the conventional document feeding apparatus.

The above-described object is achieved in the present invention by a document feeding apparatus comprising a paper feeding tray on which a document is placed, a transfer unit that transfers the document placed on the paper feeding tray to a reading position, a paper delivery tray for receiving the document from said reading position, a platen cover for a platen glass of an image processing device, a first paper delivery port for delivering to said paper delivery tray a document whose length in the transfer direction of the document is shorter than a predetermined value, and a second paper delivery port for delivering to said paper delivery tray a document whose length in the transfer direction of the document is longer than the predetermined value, wherein said reading position, said second paper delivery port, and said first paper delivery port are arranged in order with a space therebetween in the transfer direction of the document.

Further, the above-described object is achieved by a document feeding apparatus comprising a paper feeding tray, a transfer unit that transfers a document placed on the paper feeding tray to a reading position, at least two paper delivery trays for receiving the document from said reading position, and a platen cover for a platen glass of an image processing device, wherein said paper delivery trays are positioned above said platen cover, and a paper delivery path for delivering the document to one of said paper delivery trays is formed between the other of said paper delivery trays and said platen cover.

The above and other objects as well as advantageous features of the invention will become apparent from a consideration of the following description of the preferred embodiments taken in conjunction with the appended claims, and the accompanying drawings.

DESCRIPTION OF THE PREFERRED EMBODIMENTS

Figure 1:
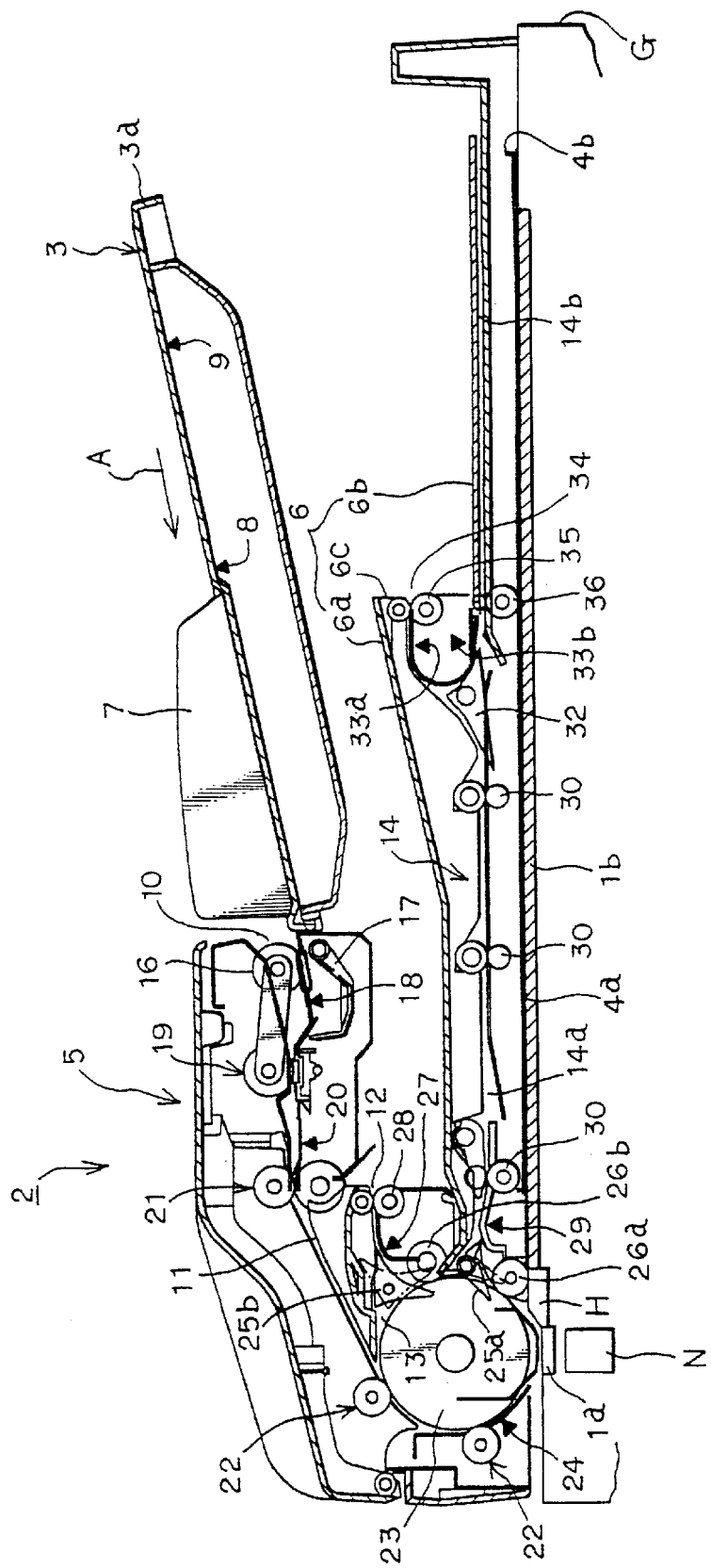
FIG. 1 is a sectional view of a document feeding apparatus according to the present invention.
Figure 2:
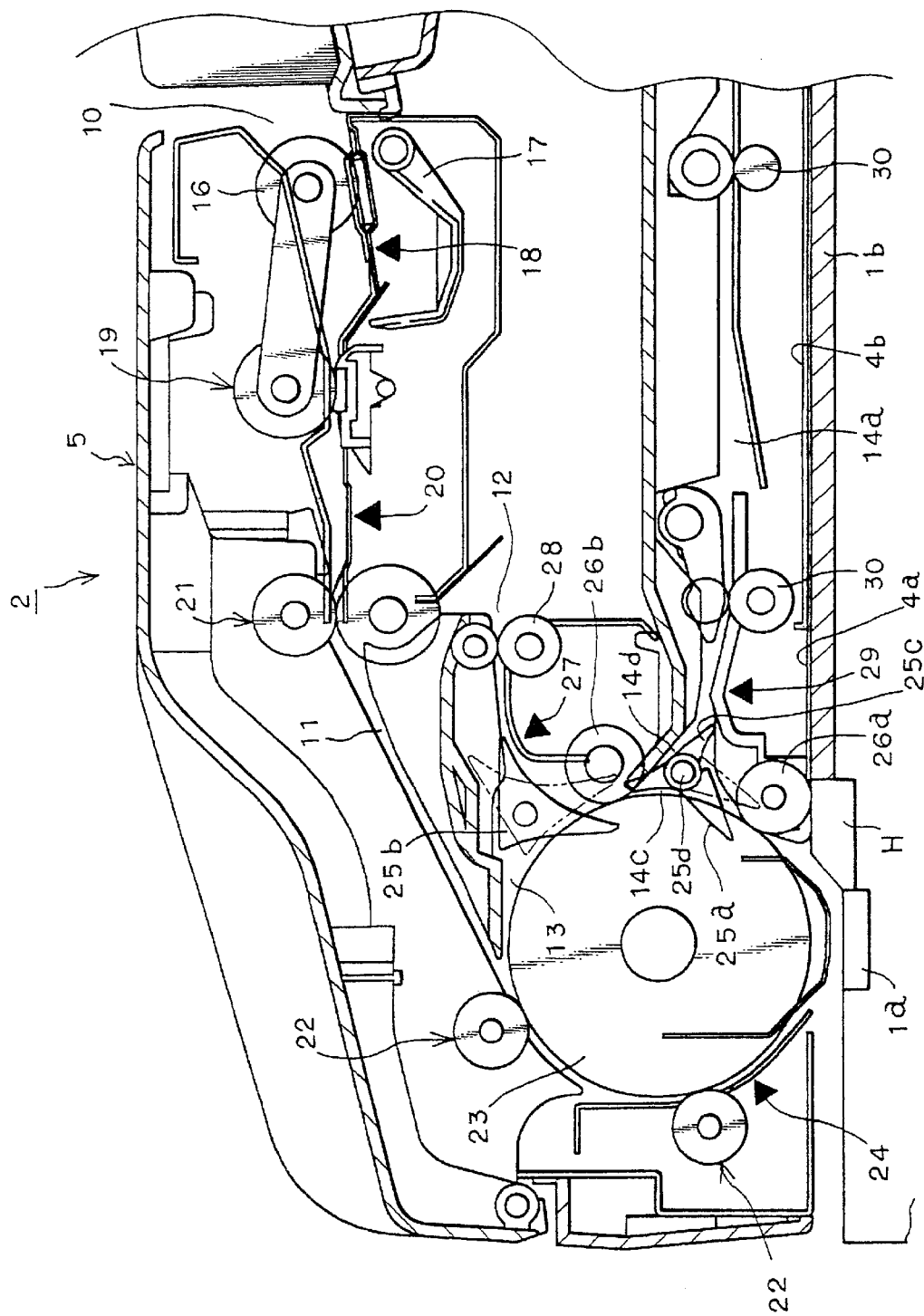
FIG. 2 is an enlarged view of an essential portion of the document feeding apparatus shown in FIG. 1.

An embodiment of a document feeding apparatus according to the present invention will now be explained with reference to the accompanying drawings. FIG. 1 and FIG. 2 show the document feeding apparatus 2 of the present invention mounted by a back hinge on an image processing device G such as a reproducing machine and an image scanner movably to an open position and a closed position.

The image processing device G comprises a movable image input portion N for reading an image of a document, a first platen glass 1a through which the image input portion N reads the image of the document while the document is moved, a second platen glass 1b on which the document is placed, through which the image of the document is read by the image input portion N, and a guide H for scooping up the document supplied on said first platen glass 1a.

In case that the image of the document is read by the image input portion N while the document is moved, the image input portion N is moved to the underside of said first platen glass 1a. In case that the image of the document is read by the image input portion N after the document is placed on the second platen glass 1b and pressed down on the second platen glass 1b by a press plate 4b, the image input portion N is moved along the underside of the second platen glass 1b. Further, a white Mylar film 4a is stuck on the lower surface of said press plate 4b.

Said document feeding apparatus 2 comprises a paper feeding portion 5 for feeding the document, a paper feeding path 11 for feeding the document supplied from the paper feeding portion 5 to the first platen glass 1a, a paper delivery path 14 for delivering through a paper delivery port 34 or 12 the document passed through the first platen glass 1a and scooped up by the guide H, a paper delivery tray 6 for receiving the document delivered from the paper delivery path 14, a circulation path 13 for returning the document passed through the first platen glass 1a to the paper feeding path 11, and a lead roller 23 for transferring the document, which is formed of a part of the paper feeding path 11, the paper delivery path 14 and the circulation path 13, as shown in FIG. 1 and FIG. 2.

Said paper feeding portion 5 is arranged above the paper delivery tray 6 and comprises a paper feeding tray 3 as a supplied document receiving portion on which a plurality of documents can be stacked, a paper feeding roller 16 positioned near a paper feeding port for feeding the documents one by one from the uppermost side of the documents stacked on the paper feeding tray 3, a stopper 17 to which the leading end of the document inserted into the paper feeding port 10 is brought into contact, an empty sensor 18 for detecting the presence or absense of the document on the paper feeding tray 3, and a separation unit 19 that separates the documents at the uppermost position and the following position with each other.

Said paper feeding tray 3 is inclined downward with respect to the transfer direction of the document indicated by an arrow A and comprises a pair of document registration plates 7 each of which is brought into contact with a side edge of the document, and a plurality of detecting sensors 8 and 9 for detecting a length of the document in the transfer direction thereof. The document registration plates 7 are separated from each other and approach to each other to registrate the side edges of the documents according to the size of the document, and the width of the document is detected by a sensor (not shown) for detecting the position of the document registration plates 7. The paper feeding path 11 comprises a register sensor 20 for detecting the documents supplied and separated one by one by the separation unit 19, a pair of register rollers 21 for registrating the leading ends of the documents, a plurality of transfer rollers 22 arranged around the lead roller 23, and a document detecting sensor 24.

The paper delivery tray 6 is divided into a long size tray 6a and a short size tray 6b adjacent to each other and extending in the document delivery direction. A step portion 6c is formed between said trays 6a and 6b. To said trays 6a and 6b, documents placed on the paper feeding tray 3 are classified according to the length of the document in the transfer direction of the document and delivered. For example, if the length of the document in the transfer direction of the document is longer than a predetermined length, for example, 240 mm, the document is delivered to the long size tray 6a, whereas, if the length of the document in the transfer direction of the document is shorter than the predetermined length, the document is delivered to the short size tray 6b.

Table 1 shows examples of the long size documents delivered to the long size tray 6a, and examples of the short size documents delivered to the short size tray 6b. Even if the documents are the same in size, the document are classified to the paper delivery trays according to the difference in the document transfer direction. In the Table 1, "horizontal direction" means that the length of the document in the transfer direction of the document is shorter than the length of the document in the direction normal to the transfer direction of the document, whereas, "vertical direction" means that the length of the document in the transfer direction of the document is longer than the length of the document in the direction normal to the transfer direction of the document. The size shows the standard size and the dimension of the document is indicated in millimeters or inches.

TABLE 1

|  | SIZE | DIMENSION OF DOCUMENT (mm) | DIMENSION OF DOCUMENT (inch) | DIRECTION OF DOCUMENT |
|---|---|---|---|---|
| LONG SIZE DOCUMENT | B5 | 257*182 |  | VERTICAL DIRECTION |
|  | A4 | 297*210 |  | VERTICAL DIRECTION |
|  | B4 | 364*257 |  | VERTICAL DIRECTION |
|  | A3 | 420*297 |  | VERTICAL DIRECTION |
|  | LETTER | 215.9*279.4 | 8.5"*11" | VERTICAL DIRECTION |
|  | LEGAL | 215.9*355.6 | 8.5"*14" | VERTICAL DIRECTION |
|  | LEDGER | 279.4*461.8 | 11"*17" | VERTICAL DIRECTION |
|  | 16K | 195*267 |  | VERTICAL DIRECTION |
|  | 8K | 267*390 |  | VERTICAL DIRECTION |
| SHORT SIZE DOCUMENT | B6 | 182*128 |  | VERTICAL DIRECTION |
|  | A5 | 210*148 |  | VERTICAL DIRECTION |
|  | A5 | 210*148 |  | HORIZONTAL DIRECTION |
|  | B5 | 257*182 |  | HORIZONTAL DIRECTION |
|  | A4 | 297*210 |  | HORIZONTAL DIRECTION |
|  | STATMENT | 215.9*139.7 | 8.5"*5.5" | VERTICAL DIRECTION |
|  | STATMENT | 215.9*139.7 | 8.5"*5.5" | HORIZONTAL DIRECTION |
|  | LETTER | 215.9*279.4 | 8.5"*11" | HORIZONTAL DIRECTION |
|  | 16K | 195*267 |  | HORIZONTAL DIRECTION |

The short size tray 6b is arranged underside of the paper feeding tray 3 and in the downstream of the long size tray 6a, and separated with a large space from the paper feeding tray 3, so that the short size document on the short size tray 6b can easily be recognized and taken out easily. Further, the end of the short size tray 6b is projected from the rear end 3a of the paper feeding tray 3, so that the handling of the short size tray 6b can be enhanced.

The paper delivery path 14 comprises a first paper delivery path 14a for delivering the document supplied on the image input portion N to the short size tray 6b arranged in the downstream of the transfer direction of the document, a first turning over paper delivery path 14b for transferring further to the short size tray 6b the document supplied to said first paper delivery path 14a, transferring in the reverse direction the document along a U-shaped path and delivering the document to the short size tray 6b, a second paper delivery path 14c for delivering the document passed through the image input portion N to the long size tray 6a arranged in the upstream of the transfer direction of the document, and a second turning over paper delivery path 14d for transferring the document supplied to said first paper delivery path 14a in the reverse direction along a U-shaped path and delivering the document tn the long size tray 6a, as shown in FIG. 2. A first flapper 25a is provided at a connecting portion connecting the first paper delivery path 14a with the second turning over paper delivery path 14c. A third flapper 25c is provided at a connecting portion connecting the first paper delivery path 14a with the second turning over paper delivery path 14d.

Said first flapper 25a is driven centering around a shaft 25d by a solenoid, so that when the solenoid is deenergized the document is guided from the paper feeding path 11 to the first paper delivery path 14a, and the document in the first paper delivery path 14a is guided to the second turning over paper delivery path 14d. When the solenoid is energized the document is guided from the paper feeding path 11 to the second paper delivery path 14c. The third flapper 25c is supported rotatably freely by the shaft 25d and in case that the document is transferred from the paper feeding path 11 to the first paper delivery path 14a, the third flapper 25c is moved upwards by the transferred document and returned to the original position after the trailing end of the document has passed therethrough. On the other hand, in case that the document is transferred from the first paper delivery path 14a to the second turning over paper delivery path 14d, the third flapper 25c interrupts the paper feeding path 11 so that the document is guided to the second turning over paper delivery path 14d.

The first paper delivery path 14a comprises a transfer roller 26a which is brought into pressure contact with the lead roller 23, a document detection sensor 29 arranged near the first flapper 25a, a plurality of pairs of rollers 30, and a document detection sensor 33a and a pair of delivery rollers 35, both are arranged near the paper delivery port 34. A flapper 32 is provided at a connecting portion connecting the first paper delivery path 14a and the first turning over paper delivery path 14b.

Said first flapper 32 is driven by a solenoid, so that when the solenoid is deenergized the document is guided from the first paper delivery path 14a to the paper delivery port 34, and when the solenoid is energized the document is guided from the first delivery path 14a to the first turning over paper delivery path 14b, and the short size document supplied to the first turning over paper delivery path 14b is guided to the paper delivery port 34. The first turning over paper delivery path 14b is provided with a document detection sensor 33b and a pair of switch back rollers 36 which are rotatable in the normal and reverse directions.

The second paper delivery path 14c comprises a transfer roller 26b which is brought into pressure contact with the lead roller 23, a document detection sensor 27, and a pair of delivery rollers 28 for delivering the document to the paper delivery tray 6.

The long size document is delivered by the pair of delivery rollers 28 and the short size document is delivered by the pair of delivery rollers 35, by varying the positions of the delivery rollers 28 and 35 in the transfer direction of the document.

As stated above, the long size document and the short size document are classified and stored in the lower portion of the paper feeding tray 3, so that the document on the paper delivery tray 6 can be recognized easily and taken out easily from the paper delivery tray 6 while reducing the size of the document feeding apparatus.

A second flapper 25b is provided at a connecting portion for connecting the second paper delivery path 14c and the second turning over paper delivery path 14d to the circulation path 13. The second flapper 25b is driven by a solenoid, so that when the solenoid is deenergized, the document is guided toward the paper delivery port 12, and that when the solenoid is energized, the document is guided toward the circulation path 13.

The operation of the document feeding apparatus according to the present invention will be explained. First of all, the documents are placed on the paper feeding tray 3 and the document is regulated in the width direction thereof by the document registration plates 7. Further, it is designated whether the document is a dual-surface document or one-sided document.

Figure 3:
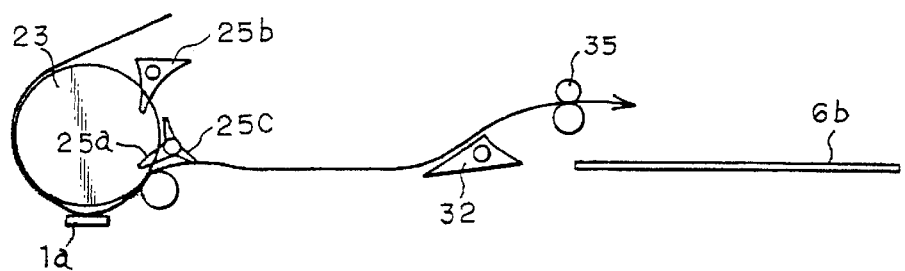
FIG. 3 is an explanatory view of the document feeding apparatus when one-sided document of short size is fed.

When the document is placed on the paper feeding tray 3, the size and orientation of the document are detected by the sensor 8 for detecting the position of the document registration plates 7 and the sensor 9 for detecting the length of the document. In case that the length of the document in the transfer direction of the document is shorter than the predetermined value or the document is a short size document, and that the document is designated as a one-sided document, the operation of the document feeding apparatus G will be explained with reference to FIG. 1 to FIG. 3. When a start switch of the document feeding apparatus G is turned ON, the stopper 17 is retracted, the document is drawn by the paper feeding roller 16 and the documents are separated one by one by the separation means 19. The leading end of the document is brought into contact with the register rollers 21 and registrated.

A predetermined time has been passed after the detection of the leading end of the document by the sensor 20, the register rollers 21 are driven to transfer the registrated document along the paper feeding path 11.

The document is read by the image input portion N when the document is passed through the platen glass 1a, supplied to the first paper delivery path 14a through the first flapper 25a, and delivered from the paper delivery port 34 through the flapper 32 to the short size tray 6b.

When the trailing end of the document is passed through the sensor 20, the next document is fed. It is possible to feed in advance the leading end of the next document to a position directly before the register rollers 21 or the transfer roller 22.

Figure 4A:
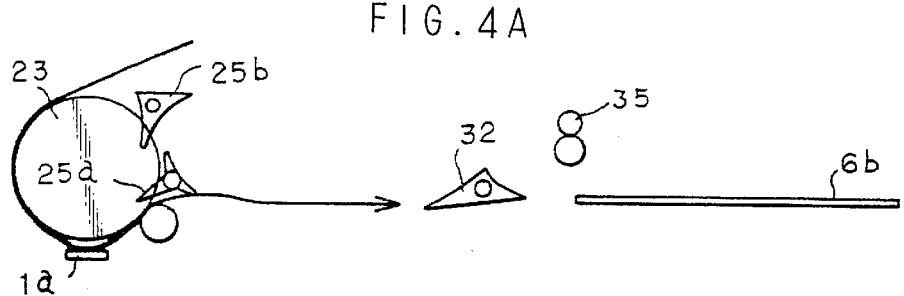
FIG. 4A is an explanatory view of the document feeding apparatus when a dual-surface document of short size is fed.

In case that the length of the document in the transfer direction of the document is shorter than the predetermined value and that the document is designated as a dual-surface document, the operation of the document feeding apparatus G will be explained with reference to FIG. 1, FIG. 2 and FIG. 4. The document is read by the image input portion N when the document is passed through the image input portion N and fed to the first paper delivery path 14a, as shown in FIG. 4A.

Figure 4B:
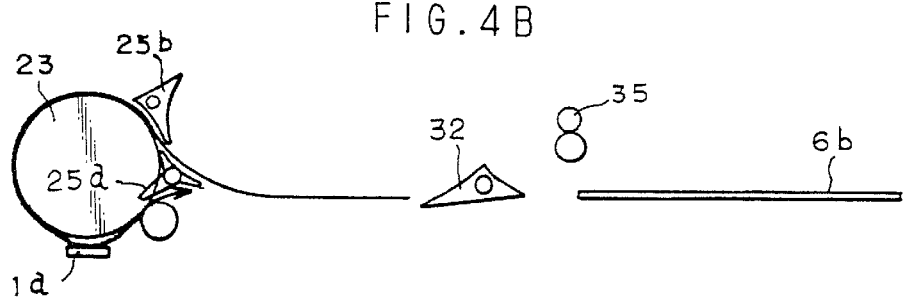
FIG. 4B is an explanatory view of the document feeding apparatus shown in FIG. 4A.
Figure 4C:
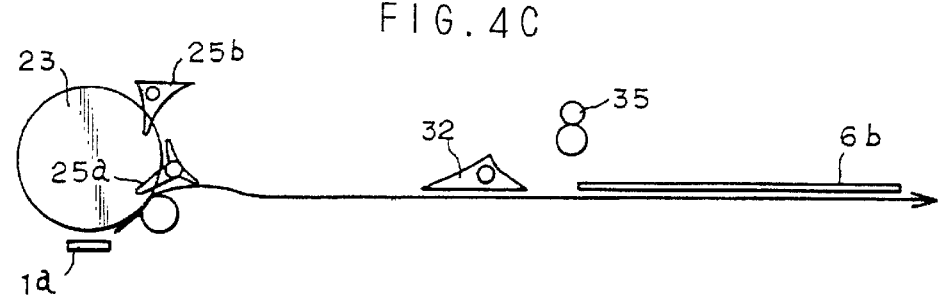
FIG. 4C is an explanatory view of the document feeding apparatus shown in FIG. 4A.

The transfer of the document is stopped and the second flapper 25b is changed over, when the trailing end of the document is detected by the sensor 29, so that the document in the first paper delivery path 14a is switched back and returned to the paper feeding path 11 through the second turning over paper delivery path 14b and the circulation path 13, as shown in FIG. 4B. In this state, the document is reversed in inside and outside. The inside surface of the reversed document is read by the image input portion N when the reversed document is passed through the image input portion N and fed to the first turning over paper delivery path 14b through the first flapper 25a, the first paper delivery path 14a and the flapper 32, as shown in FIG. 4C.

Figure 4D:
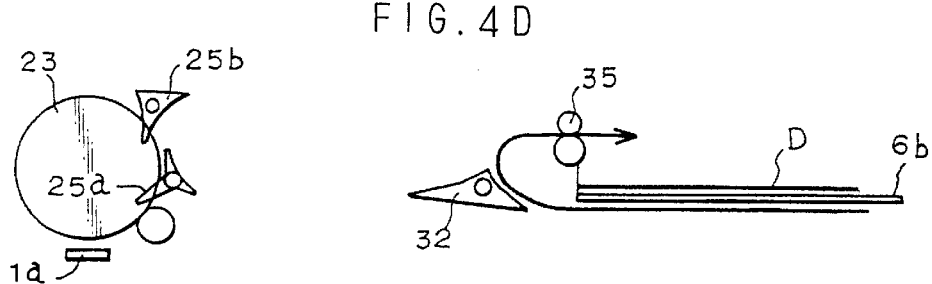
FIG. 4D is an explanatory view of the document feeding apparatus shown in FIG. 4A.

This document is then switched back, fed upwards through the U-shaped path and delivered in the reversed state to the short size tray 6b from the paper delivery port 34, as shown in FIG. 4D. As stated above, in case of the short size document, the document whose inside surface has been read is fed from the first paper delivery path 14a to the first turning over paper delivery path 14b and delivered directly to the short size tray 6b through the flapper 32, so that it is not necessary to fed the document to the image input portion N along the lead roller 23, unlike as in the case of the conventional document feeding apparatus.

Accordingly, the following document can be fed at the same time that the leading end of the document is passed through the image input portion N in order to read the inside surface thereof, so that the transfering and processing speed of the document can be increased to a large extent and the image input portion N is prevented from being soiled more than necessary.

Figure 5:
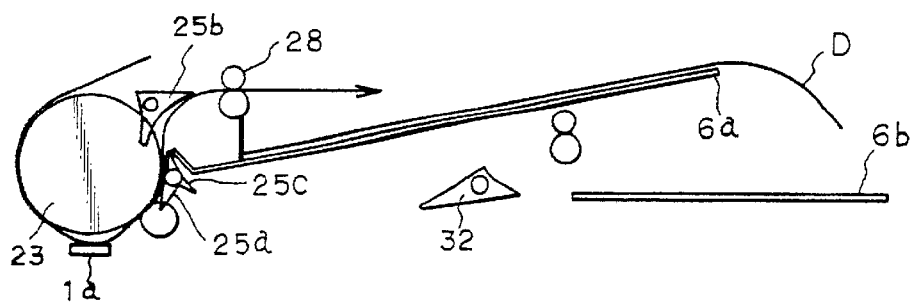
FIG. 5 is an explanatory view of the document feeding apparatus when one-sided document of long size is fed.

The operation of the document feeding apparatus in case that the document is longer than a predetermined value and is one-sided document will be explained with reference to FIG. 5. In this case, the document passed through the image input portion N is delivered from the paper delivery port 12 of the second paper delivery path 14c to the long size tray 6a through the first flapper 25a and the second flapper 25b.

Further, the long size tray 6a is continued via the step portion 6c to the short size tray 6b in the delivery direction of the document. The leading end portion of the document longer than the predetermined value may be supported by the short size tray 6b, so that the space can be used effectively.

The operation of the document feeding apparatus in case that the document is longer than a predetermined value and is a dual-face document will be explained with reference to FIG. 6.

Figure 6A:
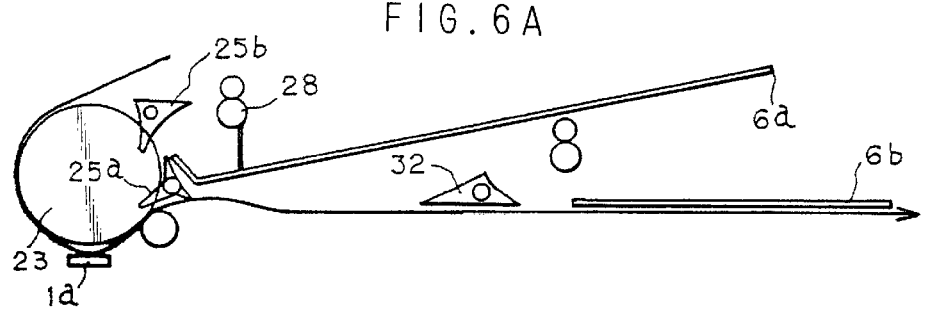
FIG. 6A is an explanatory view of the document feeding apparatus when a dual-surface document of long size is fed.

In this case, the document which is passed through the image input portion N and read is fed through the flapper 25a to the first paper delivery path 14a and fed through the flapper 32 to the first turning over paper delivery path 14b, as shown in FIG. 6A.

Figure 6B:
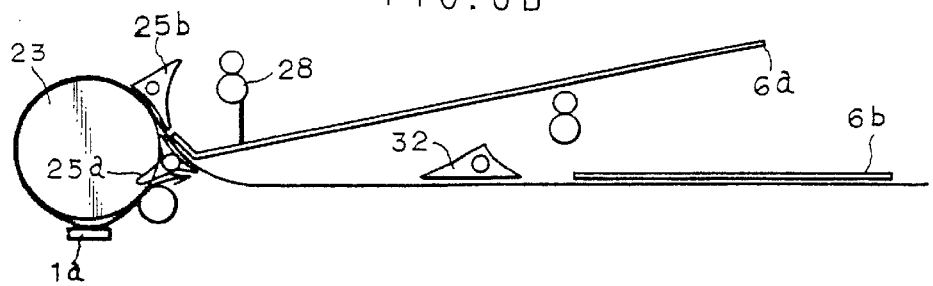
FIG. 6B is an explanatory view of the document feeding apparatus shown in FIG. 6A.

The transfer of the document is stopped, and the flapper 25b is switched over when the trailing end of the document is detected by the sensor 29, so that the document is stretched over the first paper delivery path 14a and the first turning over paper delivery path 14b. The document is then switched back and returned to the paper feeding path 11 in the state that the document is reversed in inside and outside through the second turning over paper delivery path 14b and the circulation path 13, as shown in FIG. 6B.

Figure 6C:
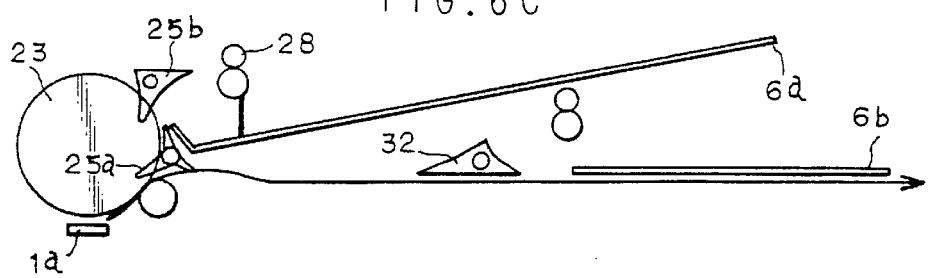
FIG. 6C is an explanatory view of the document feeding apparatus shown in FIG. 6A.

The inside surface of the document reversed in inside and outside is read by the image input portion N when the reversed document is passed through the image input portion N and fed to the first paper delivery path 14a through the first flapper 25, and fed to the first turning over paper delivery path 14b through the flapper 32 so that the document is stretched over the first paper delivery path 14a and the first turning over paper delivery path 14b, as shown in FIG. 6c.

Figure 6D:
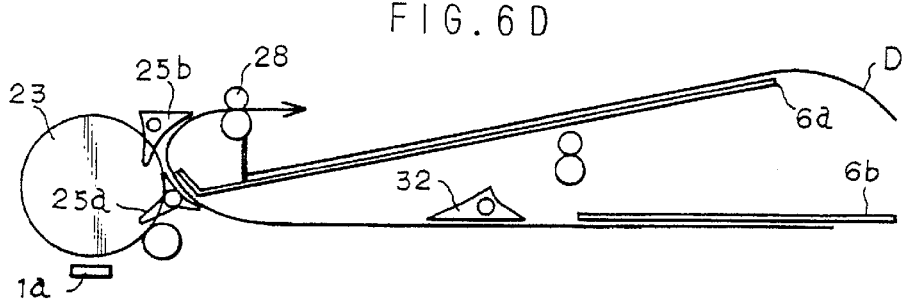
FIG. 6D is an explanatory view of the document feeding apparatus shown in FIG. 6A.

When the trailing end of the document is detected by the sensor 29, the transfer of the document is stopped and the document is delivered to the long size tray 6a through the paper delivery port 12 of the second turning over paper delivery path 14d, as shown in FIG. 6D. Then the trailing end of the document is passed through the sensor 29 a following document is supplied from the paper feeding tray 3. Further, the document is not passed through the image input portion N in case that the document is delivered to the long size tray 6a in regular sequence in page order. Accordingly, the document is prevented from being soiled at the image input portion N.

In the above case, the length of the document in the transfer direction thereof is detected on the paper feeding tray 3. However, the length of the document in the transfer direction thereof can be determined by detecting the leading end and the trailing end of the document in the course of the transfer of the document in an apparatus wherein the length of the paper feeding path 11 is sufficient for the detection of the length of the document in the transfer direction thereof.

FIG. 7 to FIG. 12 show document feeding apparatuses of other embodiments according to the present invention. Parts of the apparatuses which are similar to corresponding parts of the apparatus described above have been given corresponding reference numerals and need not be further redescribed.

Figure 7:
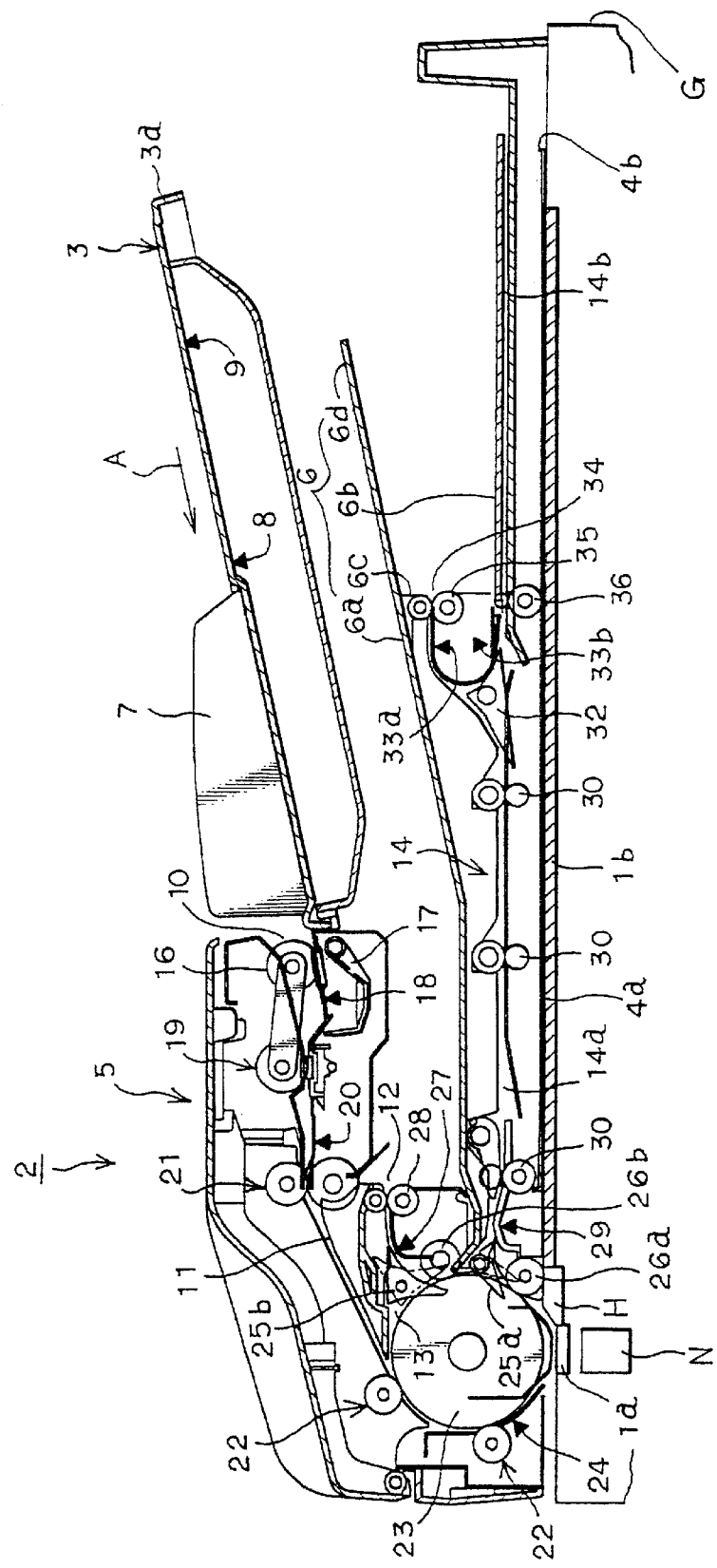
FIG. 7 is a sectional view of a document feeding apparatus of a second embodiment according to the present invention.

In the embodiment shown in FIG. 7, an extended portion 6d extending above the short tray 6b from the upper end of the step portion 6c is provided so as to elongate substantially the long size tray 6a. The document placed on the short size tray 6b can still be recognized easily, because the short size tray 6b is projected in the paper delivery direction beyond the extended portion 6d of the long sized tray 6a, even though the extended portion 6d is positioned above the short size tray 6b.

Figure 8:
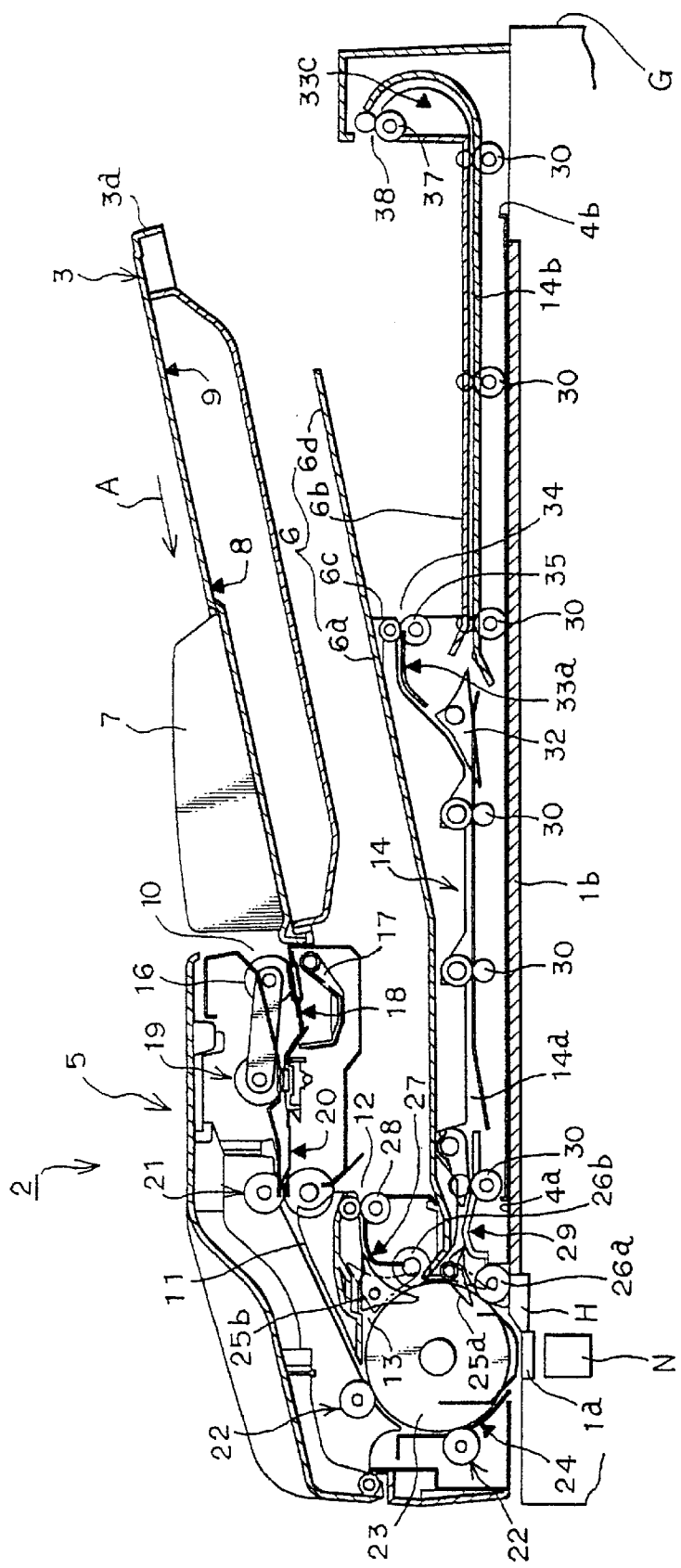
FIG. 8 is a sectional view of a document feeding apparatus of a third embodiment according to the present invention.

In the embodiment shown in FIG. 8, the switching back function in case of the short size dual-surface document is omitted, but the first turning over paper delivery path 14b is extended. A delivery unit having a pair of delivery rollers 37 and a document detecting sensor 33c is provided at said extended portion of the paper delivery path 14b so as to invite the dual-surface document onto the short size tray 6b through a paper delivery port 38 by the delivery roller 37. In this embodiment, the switching back operation of the short size document is not necessary and by switching over the flapper 32 the short size one-sided document is delivered through the first paper delivery path 14a from a paper delivery port 34 and the short size dual-surface document is delivered from the paper delivered port 38 in the reversed state through the first turning over paper delivery path 14b.

The paper feeding apparatus in each of the above-mentioned embodiments is of the type that the documents are stacked on the paper feeding tray 3 with a first paper thereof being the upper surface, and the documents are delivered one by one from the upper side thereof. However, the document can be delivered from the under side thereof. Specifically, a paper feeding roller 16a is positioned near the lowermost one of the documents and pressure unit 16b for pressing the document against the paper feeding roller 16a is provided at the paper feeding portion in order to deliver the document from the lowermost side thereof, as shown in FIG. 9.

Figure 9:
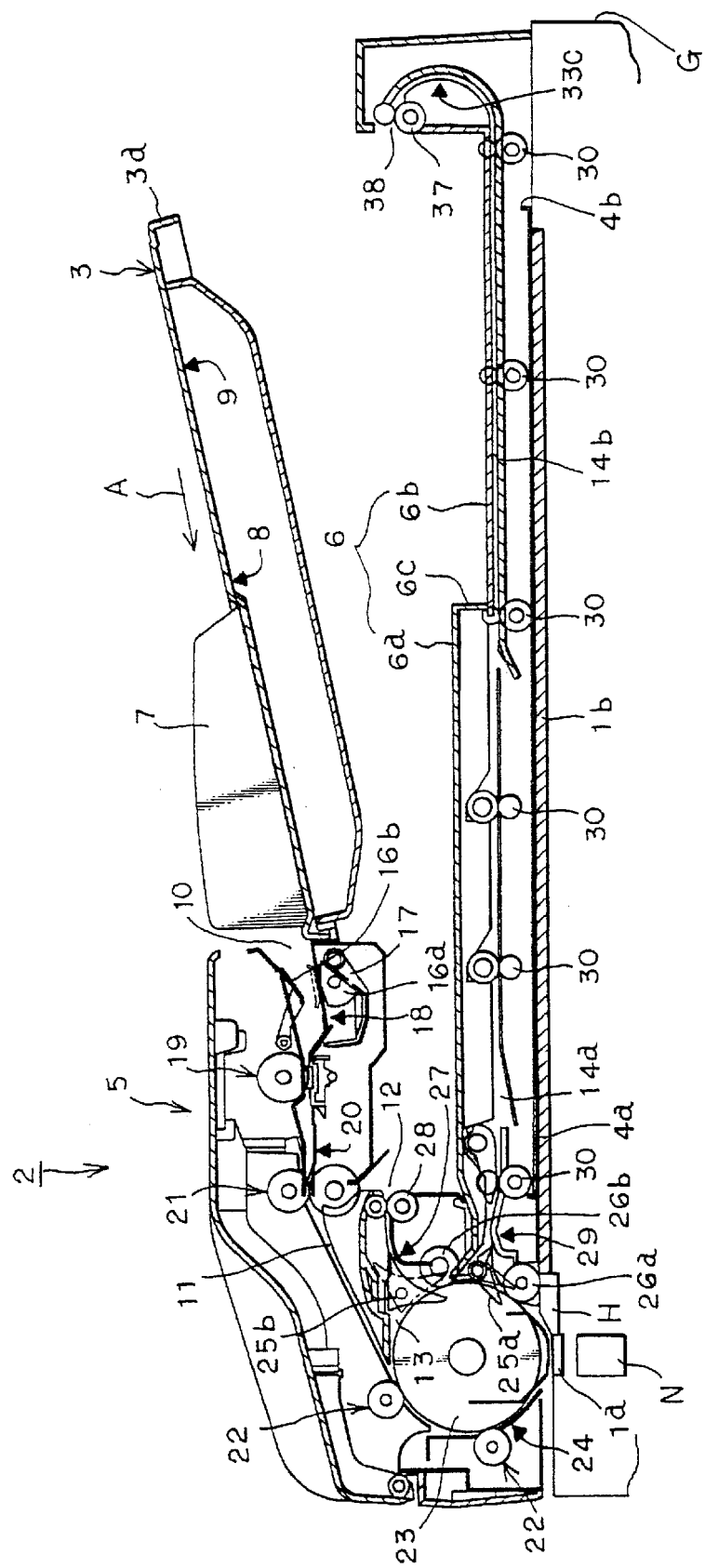
FIG. 9 is a sectional view of a document feeding apparatus of a fourth embodiment according to the present invention.

Further, as shown in FIG. 9, the first paper delivery path 14a and the first turning over paper delivery path 14b are connected in series without using the flapper 32. The document detecting sensor 33, the paper delivery port 34 and the delivery rollers 35 arranged between the first paper delivery path 14a and the first turning over paper delivery path 14b are omitted, so that all of the short size documents are delivered from the paper delivery port 38 to the short size tray 6b. Further, it is not always necessary to provide the dual-surface document transfer function.

Accordingly, in the document feeding apparatus shown in FIG. 9, the document delivered from the lowermost side of the documents is received by the short size tray 6b through the platen glass 1a, the first flapper 25a, the first paper delivery path 14a and the first turning over paper delivery path 14b, in case of the transfer of the short size one-sided document.

Further, in case that the long size document is fed, the document delivered from the uppermost side of the documents is fed to the first turning over paper delivery path 14b through the platen glass 1a, first flapper 25a, the first paper delivery path 14a, and is then switched back to the long size tray 6a through the first flapper 25, the second turning over paper delivery path 14d and the second flapper 25b.

Figure 10:
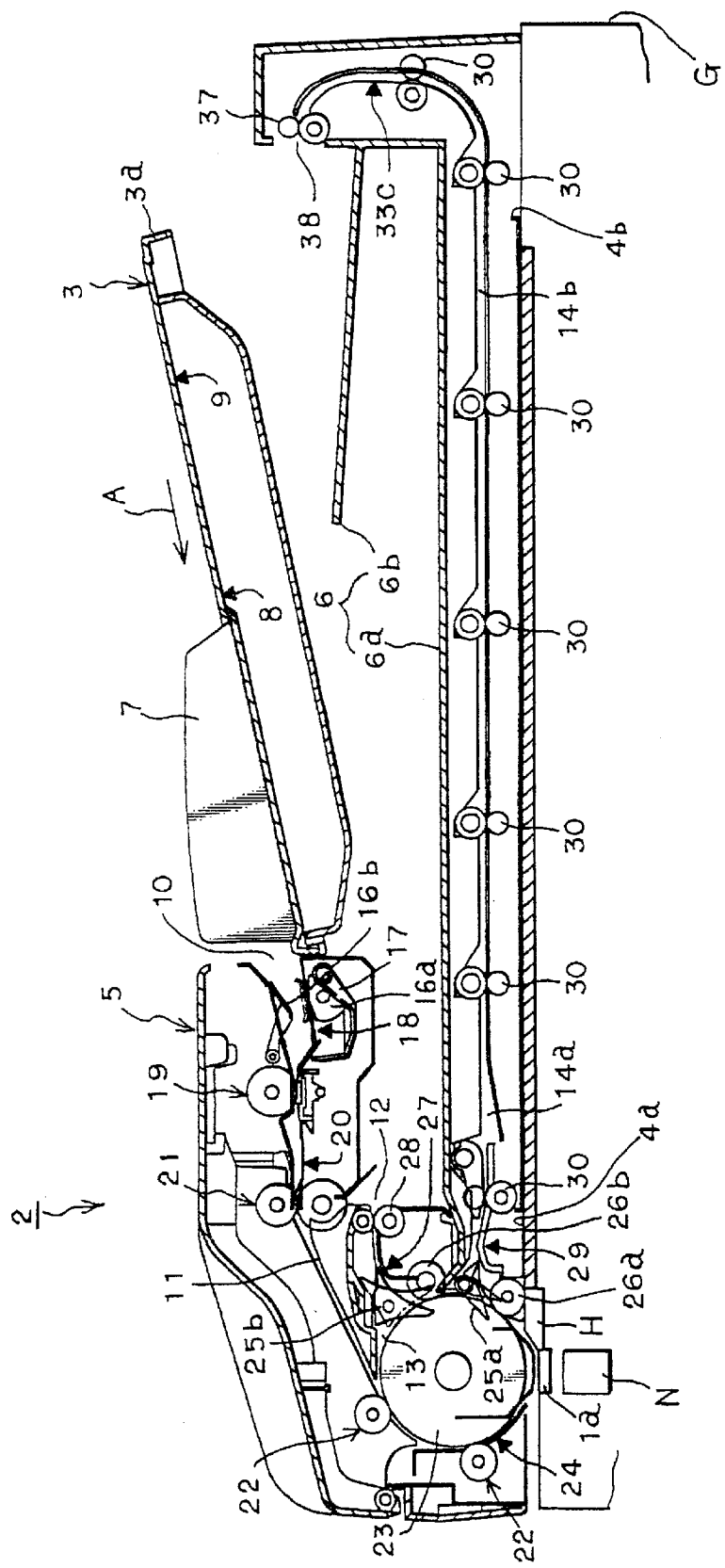
FIG. 10 is a sectional view of a document feeding apparatus of a fifth embodiment according to the present invention.

Furthermore, in this embodiment, the paper delivery port 34 and the delivery rollers 35 are deleted and accordingly it is possible to enhance the utility of the space and the ability of the recognition of the delivered document by using a flat or inclined long size tray 6a having no step portion and by providing separately the short size tray 6b above the long size tray 6a, as shown in FIG. 10.

Figure 11:
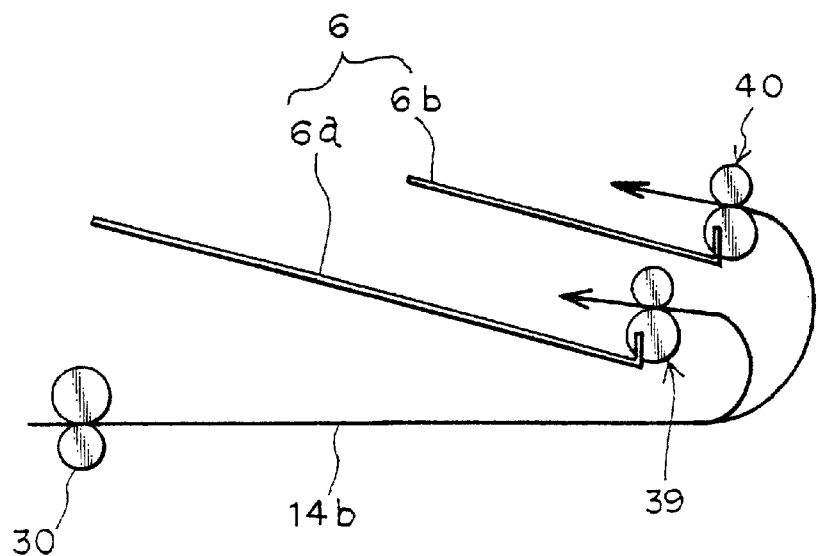
FIG. 11 is an enlarged view of an essential portion of a document feeding apparatus of a sixth embodiment according to the present invention.

As shown in FIG. 11, a pair of delivery rollers 39 can be arranged below a pair of delivery rollers 40, and the long size tray 6a and the short size tray 6b can be projected therefrom, respectively.

Figure 12:
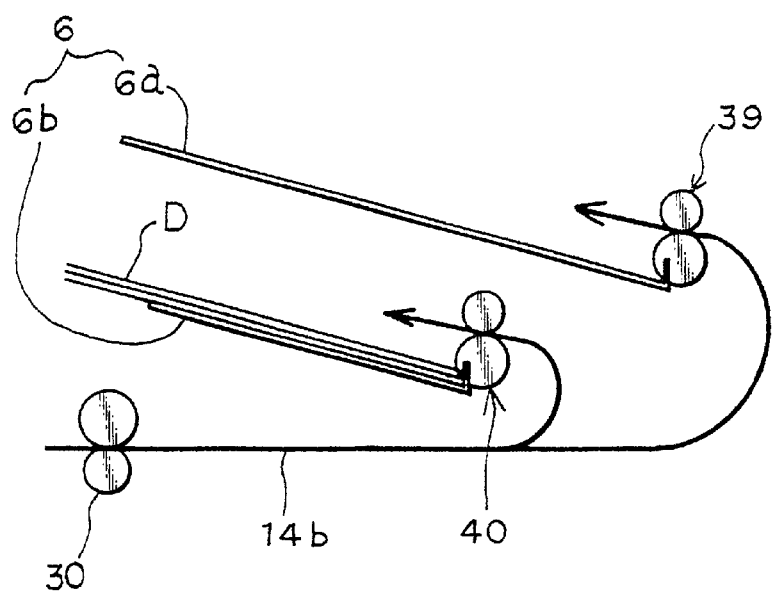
FIG. 12 is an enlarged view of an essential portion of a document feeding apparatus of a seventh embodiment according to the present invention.

As shown in FIG. 12, on the contrary, the delivery rollers 39 can be arranged above the delivery rollers 40, and the long size tray 6a and the short size tray 6b can be projected therefrom, respectively. In such case, the length of the lower stage tray 6b in the document delivery direction can be shortened compared with the length of the document in the delivery direction of the document to be placed on the tray 6b. Specifically, the leading end of the upper stage tray 6a is projected in the delivery direction of the document from the leading end of the lower stage tray 6b, and the leading end of the document placed on the lower stage tray 6b is projected from said leading end of the upper stage tray 6a, so that the document placed on the lower stage tray 6b can be recognized easily.

EFFECTS OF THE INVENTION

According to the document feeding apparatus of the present invention, a short size document placed on the paper delivery tray can be recognized without being disturbed by the paper feeding tray or the long size tray 6a, and the short size document can easily be taken out and the handling thereof can be enhanced.

Further, according to the present invention, the document reading portion is prevented from being soiled, because dual-surface documents are delivered one by one in regular sequence in page order on the paper delivery tray through the turning over paper delivery path provided in the paper delivery path, and it is not necessary to pass the documents through the document reading portion, unlike as in the case of the conventional apparatus.

Especially when short size dual-face documents are delivered one by one in regular sequence in page order on the paper delivery tray after each of the documents is reversed inside and outside, the reversal operation can be carried out in the turning over paper delivery path separated from the paper feeding path, so that when the inside surface of the document is passed through the document reading portion, the following document can be fed from the paper feeding tray and the transfering and processing time can be reduced remarkably.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A document feeding apparatus comprising:
   a paper feeding tray on which a document is placed,
   a transfer unit that transfers the document placed on the paper feeding tray to a reading position,
   a paper delivery tray for receiving the document from said reading position,
   a platen cover for a platen glass of an image processing device,
   a first paper delivery port for delivering to said paper delivery tray a document whose length in a transfer direction is shorter than a predetermined value, and
   a second paper delivery port for delivering to said paper delivery tray a document whose length in the transfer direction is longer than the predetermined value,
   wherein said reading position, said second paper delivery port, and said first paper delivery port are arranged in order with a space therebetween in the transfer direction.

2. The document feeding apparatus as claimed in claim 1, wherein said paper delivery tray comprises a first paper delivery tray for receiving the document from said first paper delivery port, and a second paper delivery tray for receiving the document from said second paper delivery port.

3. The document feeding apparatus as claimed in claim 2, wherein said first paper delivery tray is positioned below said second paper delivery tray.

4. A document feeding apparatus as claimed in claim 1, wherein said reading position is determined so that an image of said document which is fed by said transfer unit is read by a stationary reading unit.

5. A document feeding apparatus comprising:
   a paper feeding tray,
   a transfer unit that transfers a document placed on the paper feeding tray to a reading position,
   at least two paper delivery trays for receiving the document from said reading position, and
   a platen cover for a platen glass of an image processing device,
   a paper delivery path for delivering the document to a first one of said paper delivery trays, said paper delivery path being formed between a second one of said paper delivery trays and said platen cover,
   a first turning over paper delivery path for turning over the document and guiding the document to said first one of said paper delivery trays, said first one of said paper delivery trays being arranged along said paper delivery path, and
   a second turning over paper delivery path for turning over the document and guiding the document to the second one of said paper delivery trays.

6. The document feeding apparatus as claimed in claim 5, wherein said paper delivery path comprises:
   a first paper delivery path for guiding the document to the first one of said paper delivery trays, said first one of said paper delivery trays being arranged along said first paper delivery path, and
   a second paper delivery path for guiding the document to the second one of said paper delivery trays.

7. A document feeding apparatus as claimed in claim 5, wherein said second turning over paper delivery tray is adapted to reverse the transfer direction of the document and then turn over the document and guide the document to the second one of said paper delivery trays.

8. A document feeding apparatus as claimed in claim 7, wherein a part of said second turning over paper delivery path is formed by said paper delivery path.

9. A document feeding apparatus as claimed in claim 5, wherein said first turning over paper delivery tray is adapted to reverse the transfer direction of the document and then turn over the document and guide the document to one of said paper delivery trays.

10. The document transfer apparatus as claimed in claim 5, wherein a part of said first turning over paper delivery path is formed between one of said paper delivery trays and said platen cover.

11. A document feeding apparatus comprising:
    a paper feeding tray on which a document is placed,
    a first paper delivery tray positioned under the paper feeding tray for receiving the document when a length of the document in a transfer direction is shorter than a predetermined length,
    a second paper delivery tray positioned under the paper feeding tray for receiving the document when the length of the document in the transfer direction is longer than the predetermined length,
    a first paper delivery path for delivering the document from a reading position to the first paper delivery tray, and
    a second paper delivery path for delivering the document from the reading position to the second paper delivery tray,
    wherein the first paper delivery path is positioned under the second paper delivery tray and the first paper delivery tray is positioned so that at least a part of the first paper delivery tray is not overlapped with the paper feeding tray and the second paper delivery tray.

* * * * *